US012315483B2

(12) United States Patent
Lu et al.

(10) Patent No.: US 12,315,483 B2
(45) Date of Patent: May 27, 2025

(54) PICKUPS FOR ENHANCED PLAYABILITY OF MUSICAL INSTRUMENT, STRINGED INSTRUMENT WITH PICKUPS, AND METHOD FOR CONTROLLING PICKUPS

(71) Applicant: GuangZhou LAVA MUSIC LLC., Guangzhou (CN)

(72) Inventors: Zi-Tian Lu, Guangzhou (CN); Cheuk Ho Tse, Guangzhou (CN); Shuai Yin, Guangzhou (CN); Kai-Sheng Su, Guangzhou (CN); Fang-Fang Chen, Guangzhou (CN)

(73) Assignee: GuangZhou LAVA MUSIC LLC., Guangzhou (CN)

( * ) Notice: Subject to any disclaimer, the term of this patent is extended or adjusted under 35 U.S.C. 154(b) by 756 days.

(21) Appl. No.: 17/616,371

(22) PCT Filed: Jun. 8, 2020

(86) PCT No.: PCT/CN2020/094923
§ 371 (c)(1),
(2) Date: Dec. 3, 2021

(87) PCT Pub. No.: WO2020/244664
PCT Pub. Date: Dec. 10, 2020

(65) Prior Publication Data

US 2022/0328027 A1 Oct. 13, 2022

(30) Foreign Application Priority Data

Jun. 6, 2019 (CN) ......................... 201910494960.0
Jun. 6, 2019 (CN) ......................... 201920859306.0

(51) Int. Cl.
*G10H 3/18* (2006.01)
*G10D 1/08* (2006.01)
(Continued)

(52) U.S. Cl.
CPC ............. *G10H 3/186* (2013.01); *G10D 1/085* (2013.01); *G10H 1/0008* (2013.01); *G10H 1/14* (2013.01);
(Continued)

(58) Field of Classification Search
CPC ........ G10H 3/186; G10H 1/0008; G10H 1/14; G10H 2220/096; G10H 2220/461; G10D 1/085
(Continued)

(56) References Cited

U.S. PATENT DOCUMENTS 10,115,379 B1 * 10/2018 Juszkiewicz ............. G10H 1/46
2007/0131100 A1 * 6/2007 Daniel ................... G10H 1/053 84/737
(Continued)

FOREIGN PATENT DOCUMENTS

AU 2004245773 B2 * 6/2009 ........... G10H 1/0091
CN 1845775 A * 10/2006 ........... G10H 1/0091
(Continued)

*Primary Examiner* — Christina M Schreiber
(74) *Attorney, Agent, or Firm* — ScienBiziP, P.C.

(57) ABSTRACT

A pickup, a stringed instrument, and a pickup control method are disclosed. The pickup comprises: pickup components (110), multi-touch screens (130) and processing components (140). The multi-touch screens (130) and the processing components (140) are connected. The pickup components (110) and the processing components (140) are connected. The pickup components (110) is configured to pick up sound information emitted by a musical instrument. The multi-touch screen (130) is configured to display function application information that is selected from a group consisting of timbre adjustment function application information, tone adjustment function application information, and equalizer adjustment function application information. The multi-touch screen is configured to receive a function triggering instruction. The multi-touch screen displays infor-
(Continued)

mation as to functional applications available through the pickup capabilities. Control functions available to a user are expanded beyond control by a single knob as in the prior art, the playing experience of a user on the instrument is enhanced.

15 Claims, 4 Drawing Sheets

(51) Int. Cl.
*G10H 1/00* (2006.01)
*G10H 1/14* (2006.01)

(52) U.S. Cl.
CPC . *G10H 2220/096* (2013.01); *G10H 2220/461* (2013.01)

(58) Field of Classification Search
USPC ............................................................ 84/735
See application file for complete search history.

(56) References Cited

U.S. PATENT DOCUMENTS

2013/0263721 A1* 10/2013 Shavit .................... G10H 1/055 84/626
2014/0150630 A1* 6/2014 Juszkiewicz ............. G10H 1/44 84/626
2015/0332660 A1* 11/2015 Adams ................. G10H 1/0066 84/645
2022/0328027 A1* 10/2022 Lu .......................... G10H 1/125
2023/0395053 A1* 12/2023 Lu ........................ G10H 1/0091

FOREIGN PATENT DOCUMENTS

CN 110136682 A * 8/2019 ............. G10D 1/085
CN 210245056 U * 4/2020 ............. G10D 1/085
EP 2945152 A1 * 11/2015 ........... G10H 1/0066
JP 57205198 A 6/1981
JP 2006527393 A 11/2006
JP 2010102261 A 5/2010
WO 2019093307 A1 5/2019

* cited by examiner

PICKUPS FOR ENHANCED PLAYABILITY OF MUSICAL INSTRUMENT, STRINGED INSTRUMENT WITH PICKUPS, AND METHOD FOR CONTROLLING PICKUPS

FIELD

The subject matter relates to a pickup, a stringed instrument, and a pickup control method.

BACKGROUND

In the process of learning musical instruments, pickups on the musical instruments are needed to assist in instrument tuning and other operations. Existing pickups display tuning and volume through LED digital tube or other display screens, and the LED digital tube is controlled by knobs to switch between the display tuning and the volume. Specifically, when you need to press the physical knob during tuning, the LED digital tube will display the note, a red light indicates that the tuning is inaccurate, and a green light indicates that the tuning is accurate. When the volume knob is rotated, the LED digital tube displays the volume level by numbers.

However, the above-mentioned method is controlled by the knob and displayed by the LED digital tube. The above method restricts the possible functions of the pickup. When adding functionality to the pickup, due to the inoperability of the LED digital tube, it is necessary to control the switch through the knob. It is necessary to add multiple knobs, but too many knobs do not appeal to a user or buyer.

SUMMARY

The purpose of the invention is to provide pickup, string instrument and pickup control method. So as to solve the problem of simple control function caused by control through knobs in the prior art, so as to enrich the playing experience.

A pickup comprising:

a pickup component, a multi-touch screen, and a processing component; the multi-touch screen is connected to the processing component, the pickup component is connected to the processing component;

the pickup component is configured to pick up sound information emitted by a musical instrument;

the multi-touch screen is configured to display function application information that is selected from a group consisting of timbre adjustment function application information, tone adjustment function application information, and equalizer adjustment function application information; the multi-touch screen is configured to receive a function triggering instruction; the function triggering instruction is generated by a user touching the multi-touch screen to realize a function control of the pickup;

the processing component is configured to generate function control information triggered by the function triggering instruction, and adjust the sound information.

Furthermore, the processing component comprises a CPLD processor or an FPGA processor.

Furthermore, the processing component comprises:

a first processor and a second processor, the first processor is configured to determine, according to the function triggering instruction, that the function triggering instruction is an instruction to trigger the tone adjustment function application information or the equalizer adjustment function application information, generate first function control information to perform tone or equalizer adjustment on the sound information;

the second processor is configured to determine, according to the function triggering instruction, that the function triggering instruction is an instruction to trigger the timbre adjustment function application information or the equalizer adjustment function application information, and generate second function control information to perform timbre adjustment or equalizer adjustment on the sound information.

For example, the first processor is an ARM processor, the second processor is a DSP processor.

Furthermore, the pickup further comprising:

a memory, the memory connected to the first processor, the first processor is configured to generate a first storage instruction related to the sound information, and transmit the first storage instruction to the second processor;

the second processor is configured to send the sound information to the first processor according to the first storage instruction; and the first processor is configured to store the sound information in the memory.

Furthermore, the pickup further comprising:

a loudspeaker combination, the loudspeaker combination is connected to the second processor and/or the first processor, and the loudspeaker combination is configured to play adjusted sound information.

Furthermore, the first processor and the second processor are concentrated on a circuit board, and the multi-touch screen is connected to the circuit board.

For example, the processing component includes a first processor and a second processor;

The first processor is constructed to the function triggering instruction to determine whether to process the real-time audio or the non-real-time audio; if the real-time audio is to be processed, the is no action need to be performed; if the non-real-time audio is to be processed, it is necessary to determine that the functional triggering instruction is timbre adjustment function application information, tone adjustment function application information, and equalizer adjustment function application information or all the above, the audio is processed accordingly.

The second processor is constructed to the function triggering instruction to determine whether to process the real-time audio or the non-real-time audio; if the non-real-time audio is to be processed, the is no action need to be performed; if the real-time audio is to be processed, it is necessary to determine that the functional triggering instruction is timbre adjustment function application information, tone adjustment function application information, and equalizer adjustment function application information or all the above, the audio is processed accordingly.

A stringed instrument comprising: a stringed instrument body; and the pickup according to any of the above embodiments, the pickup is installed on the stringed instrument body, wherein the multi-touch screen in the pickup is installed on a side panel of the stringed instrument.

A control method of a pickup, the pickup comprising: a pickup component, a multi-touch screen, and a processing component; the multi-touch screen is connected to the processing component, the pickup component is connected to the processing component;

the pickup component is configured to pick up sound information emitted by a musical instrument;

the multi-touch screen is configured to display function application information that is selected from a group consisting of timbre adjustment function application information, tone adjustment function application information, and equalizer adjustment function application information; the multi-touch screen is configured to receive a function triggering instruction; the function triggering instruction is generated by a user touching the multi-touch screen to realize a function control of the pickup;

the processing component is configured to generate function control information triggered by the function triggering instruction, and adjust the sound information, the control method comprising:

the multi-touch screen is configured to display function application information that is selected from a group consisting of timbre adjustment function application information, tone adjustment function application information, and equalizer adjustment function application information; the multi-touch screen is configured to receive a function triggering instruction;

determining whether the function application information selected by the user comprises media sound according to the function triggering instruction by the processing component;

if the judgment result of the processing component is yes, retrieving an audio package corresponding to the function triggering instruction from a memory to play the audio package, wherein, the memory is provided in the pickup and connected to the processing component; and if the judgment result of the processing component is no, retrieving a specific timbre corresponding to the function triggering instruction from the memory, and current sound information is audio processed according to the specific timbre to play the current sound information after audio processing, the current sound information is the sound information emitted by the musical instrument collected by the pickup component.

Furthermore, the pickup further comprises a speaker and an interface for connecting a speaker, before playing the audio package or playing the current sound information after audio processing, the method further comprising:

judging whether the interface is in a connected state by the processing component;

if the judgment result of the processing component is yes, sending the audio package or the current sound information after audio processing to the speaker through the interface, and using the speaker to play; and if the judgment result of the processing component is no, playing the audio package or the current sound information after audio processing through the speaker.

The present invention provides a pickup, a stringed instrument, and a pickup control method. A pickup comprising a multi-touch screen and a processing component; the multi-touch screen is connected to the processing component, the pickup component is connected to the processing component, the pickup component, the multi-touch screen, and the processing component are connected to the power supply system. In working condition, the pickup component is configured to pick up sound information emitted by a musical instrument; the multi-touch screen is configured to display function application information that is selected from a group consisting of tone adjustment function application information, tone adjustment function application information, and equalizer adjustment function application information; the multi-touch screen is configured to receive a function triggering instruction; the function triggering instruction is generated by a user touching the multi-touch screen to realize a function control of the pickup; the processing component is configured to generate function control information triggered by the function triggering instruction, and adjust the sound information.

BRIEF DESCRIPTION OF THE DRAWINGS

In order to explain the specific embodiments of the present invention or the technical solutions in the prior art more clearly, the following will briefly introduce the drawings that need to be used in the description of the specific embodiments or the prior art. Obviously, the drawings in the following description are only some embodiments. For those of ordinary skill in the art, other drawings can be obtained based on these drawings without creative work.

DETAILED DESCRIPTION

The technical solutions of the present invention will be clearly and completely described below in conjunction with embodiments. Obviously, the described embodiments are a part of the embodiments of the present invention, but not all of the embodiments. Based on the embodiments of the present invention, all other embodiments obtained by those of ordinary skill in the art without creative work shall fall within the protection scope of the present invention.

The current pickup is controlled by the knob and displayed by the LED digital tube. The above method restricts the possible functions of the pickup. When adding functionality to the pickup, due to the inoperability of the LED digital tube, it is necessary to control the switch through the knob. It is necessary to add multiple knobs, but too many knobs do not appeal to a user.

The pickup can also be used to adjust the timbre of the instrument. At present, since the knob can only be rotated to invoke different functions, consider the operability of the knob, there are generally 3 timbre s for timbre adjustment, additional timbre s cannot be monitored. The above method restricts the possible functions for timbre adjustment. However, adding more knobs will increase the user's learning burden and operation burden.

Based on this, the present invention provides a pickup, a stringed instrument, and a pickup control method. Through the multi-touch screen displaying multiple function information of the pickup, the user can view the multiple function application information displayed on the multi-touch screen. According to the application information of multiple functions, the pickup can be controlled through the multi-touch screen. After receiving the user's interaction, the processing component performs sound related processing, so that the user can have more functional choices. It avoids a paucity of functions and enriches the playing experience.

Figure 1:
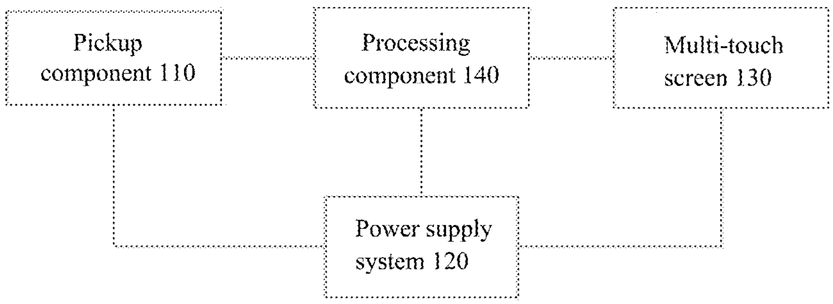
FIG. 1 is a structural view of a pickup.

The following is a detailed description in conjunction with the drawings:

As shown in FIG. 1, the present invention provides a pickup that can be installed on a musical instrument. The pickup includes: a pickup component 110, a power supply system 120, a multi-touch screen 130, and a processing component 140. The multi-touch screen 130 is connected to the processing component 140, the pickup component 110 is connected to the processing component 140, the pickup component 110, the multi-touch screen 130, and the processing component 140 are connected to the power supply system 120. The processing component includes a CPLD (Complex Programmable Logic Device) processor or an FPGA (Field-Programmable Gate Array) processor.

Figure 2:
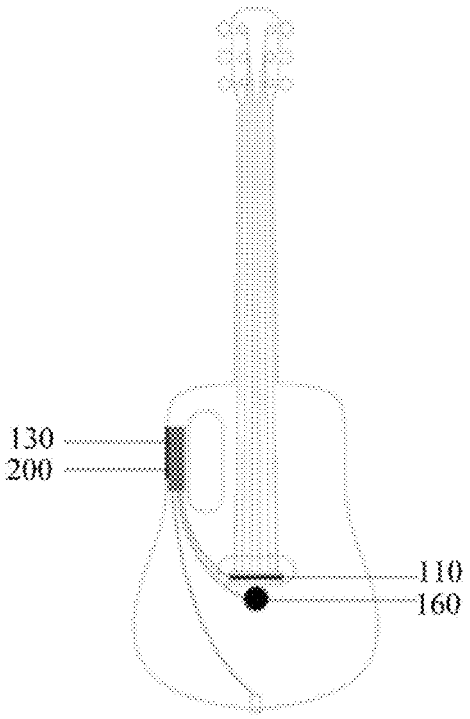
FIG. 2 is a schematic view of a stringed instrument.

The pickup component 110 is configured to pick up sound information emitted by a musical instrument on which it is installed. Wherein, a stringed instrument can be fitted with pickup. Taking the stringed instrument as an example, as shown in FIG. 2, the pickup component 110 may be installed at the strings or each of the strings, and the pickup component 110 may be a piezo.

The multi-touch screen 130 is used to display at least one of the application information of the following functions of the pickup: the timbre adjustment function application information, the tone adjustment function application information, the equalizer adjustment function application information; the multi-touch screen is configured to receive a function triggering instruction. The function triggering instruction is generated by a user touching the multi-touch screen to realize a function control of the pickup. Among them, timbre adjustment is to change the timbre effect. Timbre effect refers to changing the acoustic sound of guitar for the sound of other instruments or the sound effect added based on the acoustic sound of guitar, such as: piano sound, erhu sound, delay, reverb, chorus, heavy metal sound, rock sound and so on. The tone adjustment function application information includes multiple types of timbre and icons of the timbre adjustment function application, that is, the multi-touch screen 130 can display multiple types of timbre. The tones can be played by the stringed instrument. That is, the pitch, for example, can be tuned to change the "Do" to "Re" and so on, that is, the string on which the "Do" is originally played, but by tuning it, the output is "Re" and so on. The equalizer adjustment function application information is high/middle/bass adjustment, that is, to adjust the proportion of high, middle and bass in the sound. For example, when the treble is adjusted, the amplitude of the treble played by a stringed instrument becomes higher or lower. When the midrange is adjusted, the amplitude of midrange sounds becomes higher or lower. The application information of the equalizer adjustment function includes the icon of the tone adjustment function application and the real-time information of the high/mid/low tone, or the icon of the control information.

A user can also interact with the multi-touch screen 130 by using gestures.

The processing component 140 is configured to generate function control information triggered by the function triggering instruction according to the function triggering instruction. Thus, the sound information is adjusted. Specifically, when the user controls the timbre adjustment function of the pickup, the timbre adjustment is performed on the sound information. Or, when the user controls the tone adjustment function of the pickup, the tone adjustment is performed on the sound information. Or, when the user controls the equalization adjustment function of the pickup, the equalization adjustment is performed on the sound information. Of course, the processing component can detect the power status of a battery and send the power status to the multi-touch screen, and the multi-touch screen can also display power status information.

The working mode of FIG. 1 may be: taking volume adjustment as an example, one method is that the user clicks on the icon of the volume adjustment function application, and the multi-touch screen can display the real-time volume of the audio.

At the same time, the "+" and "−" control icons can be displayed. When the user touches the "+" control icon on the multi-touch screen, the function triggering instruction is an instruction to adjust the volume of the sound information. The processing component generates the function control information corresponding to the function triggering instruction to trigger according to the function triggering instruction, which can increase the volume of the sound information. In the same way, it can be seen that when "−" is used, the function triggering instruction is an instruction to adjust the volume of the sound information, and the processing component reduces the volume of the sound information according to the function triggering instruction. Another way is that the multi-touch screen can display the real-time volume of the audio. The user can touch the area where the real-time audio volume is displayed. When the user for example draws a track upwards on the multi-touch screen, the generated function triggering instruction is an instruction to adjust the volume of the sound information to increase. Similarly, when the user for example draws a track down on the multi-touch screen, the generated function triggering instruction is an instruction to adjust the volume of the sound information to decrease.

Similar to adjusting the volume, when adjusting the tone, the real-time information of high/middle/low tone can be displayed, and the volume level is adjusted by touching the "+" and "−" signs. Alternatively, the volume level can be adjusted by swiping the track up or down.

When performing timbre adjustment, the user clicks the icon of the timbre adjustment function application information displayed on the multi-touch screen 130, and then, the multi-touch screen 130 displays various types of timbre. The user can select the timbre by touching the desired timbre in the display area of the multi-touch screen 130.

Since the multi-touch screen 130 can display multiple types of timbre information, the user can interactively select the corresponding desired timbre type according to the multi-touch screen 130 to realize the adjustment of the timbre.

Furthermore, the types of timbre available for selection are increased, which alleviates the problem of single timbre caused by the selection of timbre through the knob in the prior art.

For the power. The power supply system 120 may include a battery and a battery management system, and the processing component 140 may collect the power status of the battery in the battery management system 120. That is, the power condition of the battery is detected. The power status is sent to the multi-touch screen 130. Among them, when the power is displayed, the red color of the power information can be displayed to indicate no power, and the green to indicate that there is power.

Of course, in the present invention, the processing component can also store functional applications such as metronome, recorder, tuner, smart trainer, loop, etc. And display the front-end interface of metronome, recorder, tuner, smart trainer, loop, and other applications on the multi-touch screen. For example, you can add APP functions such as metronome, recorder, tuner, smart trainer, loop, etc. on the multi-touch screen.

Figure 3:
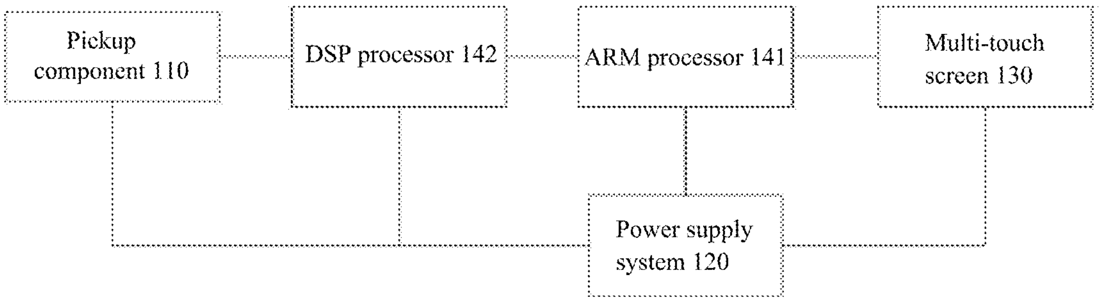
FIG. 3 is a structural view of another embodiment of the pickup.

Wherein, as shown in FIG. 3, the processing component includes a first processor and a second processor. The first processor may be a single-chip microcomputer or an ARM (Advanced RISC Machines) processor 141. The second processor may be a DSP (Demand-Side Platform) processor 142. Among them, the ARM processor 141 can be replaced with an X86 (X86 architecture) processor, an MIPS (Million Instructions Per Second) processor, or a POWER processor.

The first processor is configured to determine, according to the function triggering instruction, that the function triggering instruction is an instruction to trigger the tone adjustment function application information or equalizer adjustment function application information, generate first function control information, and perform tone or equalization on the sound information adjustment. The first processor is used for tone adjustment and equalizer adjustment.

The second processor is configured to determine, according to the function triggering instruction, that the function triggering instruction is triggering the timbre adjustment function application information or can determine that the function triggering instruction is an instruction for the equalizer adjustment function application information. Furthermore, second function control information is generated, and timbre adjustment is performed on the sound information. That is, the second processor is used for timbre adjustment or equalizer adjustment.

Alternatively, the first processor can be configured to deal with non-real-time audio equalization and tones of all audio, and the second processor can be configured to deal with real-time audio equalization and timbre; Or, real-time and non-real-time audio are not distinguished, while both the first processor and the second processor can be configured for equalizer adjustment.

The control process for timbre adjustment can be as follows. The first processor is configured to generate function control information about adjusting the timbre according to the function triggering instruction and transmit the function control information about adjusting the timbre to the second processor. In addition, the first processor determines whether it is the triggering instruction corresponding to the timbre adjustment according to the function triggering instruction. If it is, it needs to transmit the function control information for generating the timbre adjustment to the second processor. If it is not, that is, when the function triggering instruction relates to the tone adjustment function application information and the equalizer adjustment function application information, there is no need to transmit the generated control instruction to the second processor. The second processor is configured to adjust the timbre of the sound information according to the tone adjustment function control information. The user can generate and select the timbre type by clicking the displayed timbre area, and the second processor can adjust the timbre of the sound information according to the timbre type.

Wherein, as shown in FIG. 3, when the processing component includes a first processor and a second processor, the piezo can pick up the sound generated by the plucking of the strings in a pressure-sensitive manner. Then, the piezo can transmit the audio to the DSP processor 142, and the DSP processor 142 obtains the sound. Then, the DSP processor 142 transmits the sound as data to the ARM processor 141 through an interface connected to the ARM processor 141. The ARM processor 141 digitally filters the sound as data to obtain the accurate audio frequency of the sound as data. The ARM processor 141 determines the tone corresponding to the sound as data according to the accurate audio frequency. Then, the ARM processor 141 can transmit the tone to the multi-touch screen. The user can then make adjustments according to the tone that he sees in the manner described above.

When performing equalization adjustments on a stringed instrument, the sound can be acquired by the piezo or stored in the memory. The ARM processor 141 can pass the sound to the DSP processor 142. The DSP processor 142 determines the high-pitched portion, the mid-range portion, and the low-pitched portion. The user can adjust the treble part, the midrange part and the bass part by adjusting the multi-touch screen 130. Then, the ARM processor 141 sends the generated control information to the DSP processor 142 according to the function triggering instruction issued by the user.

The DSP processor 142 adjusts the treble part, the midrange part, and the bass part according to the control instruction, Thus the proportion of treble part, the midrange part and the bass part can be adjusted, to achieve the equalizer adjustment of the audio.

For example, when tone and/or timbre adjustments are made to an audio, the audio can be picked up by a piezo or stored in memory.

For example, both the first processor and the second processor can be used for equalizer adjustment. It can be that the first processor processes non-real-time audio, that is, the non-real-time audio is not immediately picked up by the pickup components and does not require immediate output. For example, the audio is delayed more than 20 milliseconds or is stored in memory. And the second processor is a DSP processor, as a result of processing speed, high real-time performance, the second processor can handle the real-time audio, that is, by the pickup component immediately collected and need immediate output audio, for example, delay no more than 20 milliseconds audio. The first processor is used to deal with non-real-time audio, the second processor is used to process real-time audio. Using a fast processor to process real-time audio can reduce the delay of real-time audio output. Using a more powerful first processor for non-real-time audio allows for more audio tuning capabilities. Thus, the user experience can be improved and the sound output effect of string instruments can be enriched.

Furthermore, the first processor is constructed to the function triggering instruction to determine whether to process the real-time audio or the non-real-time audio; if the real-time audio is to be processed, the is no action need to be performed; if the non-real-time audio is to be processed, it is necessary to determine that the functional triggering instruction is timbre adjustment function application information, tone adjustment function application information, and equalizer adjustment function application information or all the above, the audio is processed accordingly;

the second processor is constructed to the function triggering instruction to determine whether to process the real-time audio or the non-real-time audio; if the non-real-time audio is to be processed, the is no action need to be performed; if the real-time audio is to be processed, it is necessary to determine that the functional triggering instruction is timbre adjustment function application information, tone adjustment function application information, and equalizer adjustment function application information or all the above, the audio is processed accordingly.

In addition, in current pickups, the storage of sound information cannot be performed, and an external recording device and storage device are required to store the sound, which makes the usage process more troublesome.

Based on this, the pickup also includes a memory. The memory is connected to the first processor. When the memory needs to store either processed or unprocessed real-time audio. The first processor is configured to generate a first storage instruction related to the sound information and transmit the first storage instruction to the second processor. The second processor is configured to send the unprocessed or processed sound information to the first processor according to the first storage instruction. The first processor is configured to store the sound information in the memory. In detail, the user selects a related instruction with a storage function on the multi-touch screen, so that the first processor can generate the first storage instruction for the sound information. The first processor issues the first storage instruction to the second processor. After the second processor retrieves the sound information picked up by the pickup component, the second processor transmits it back to the first processor. The storage operation is performed by the first processor or it can be transmitted to other device ports, so as to achieve the function of storing and transmitting sound. Of course, the adjusted sound information can also be stored, where the adjustment can be volume, pitch, or timbre adjustment, which can be an adjustment of equalizer between them.

For example, when the memory needs to store processed non-real-time audio, the first processor can directly send the processed non-real-time audio to the memory according to the storage instructions.

Wherein, the pickup further includes: a speaker combination 160, and the speaker combination 160 is connected to the second processor.

The speaker combination 160 is used to play the adjusted sound information. Wherein, the adjusted sound information includes sound information after volume adjustment, or tone adjustment, or equalizer adjustment, or timbre adjustment.

The sound information can be played through two channels. One channel sends sound information to the speaker through the interface that can be used to connect the speaker and use the speaker to play it. The other channel is for directly playing through a speaker on the pickup.

For example, the speaker combination 160 can be connected to both the first processor and the second processor, and can play sound information adjusted by the first processor and the second processor, or unadjusted real-time audio or non-real-time audio.

Referring back to FIG. 2, The first processor 140 and the second processor are concentrated on the circuit board 200. The multi-touch screen 130 is connected to the circuit board 200. The circuit board can have multiple interfaces. The interface is connected to the multi-touch screen 130. The interface can be connected to the pickup component 110. The interface can be connected to the speaker combination 160.

In addition, For pickups that include a screen and a knob, it is extremely difficult to modify the content displayed on the screen and the function represented by the knob. If you need to modify the content of the screen or the function represented by the knob, you need to remove the pickup from the body, modify the circuit inside, and then reinstall it. This needs to be operated by professionals, and the operation is very difficult and complicated.

The present invention upgrades and updates software applications through processing components, and thereby realizes the addition, deletion, and modification of functions. The multi-touch screen displays these updates. There is no need to disassemble the pickup from the piano body, realize zero operation, and complete function modification without difficulty.

Wherein, the pickup also includes a data transmission interface. The data transmission interface is used for charging the power supply system and for data transmission between the pickup and an external device.

The pickup also includes a wireless connector. The wireless connector is connected to the first processor. The wireless connector is used for wireless data transmission between the pickup and an external device.

Figure 4:
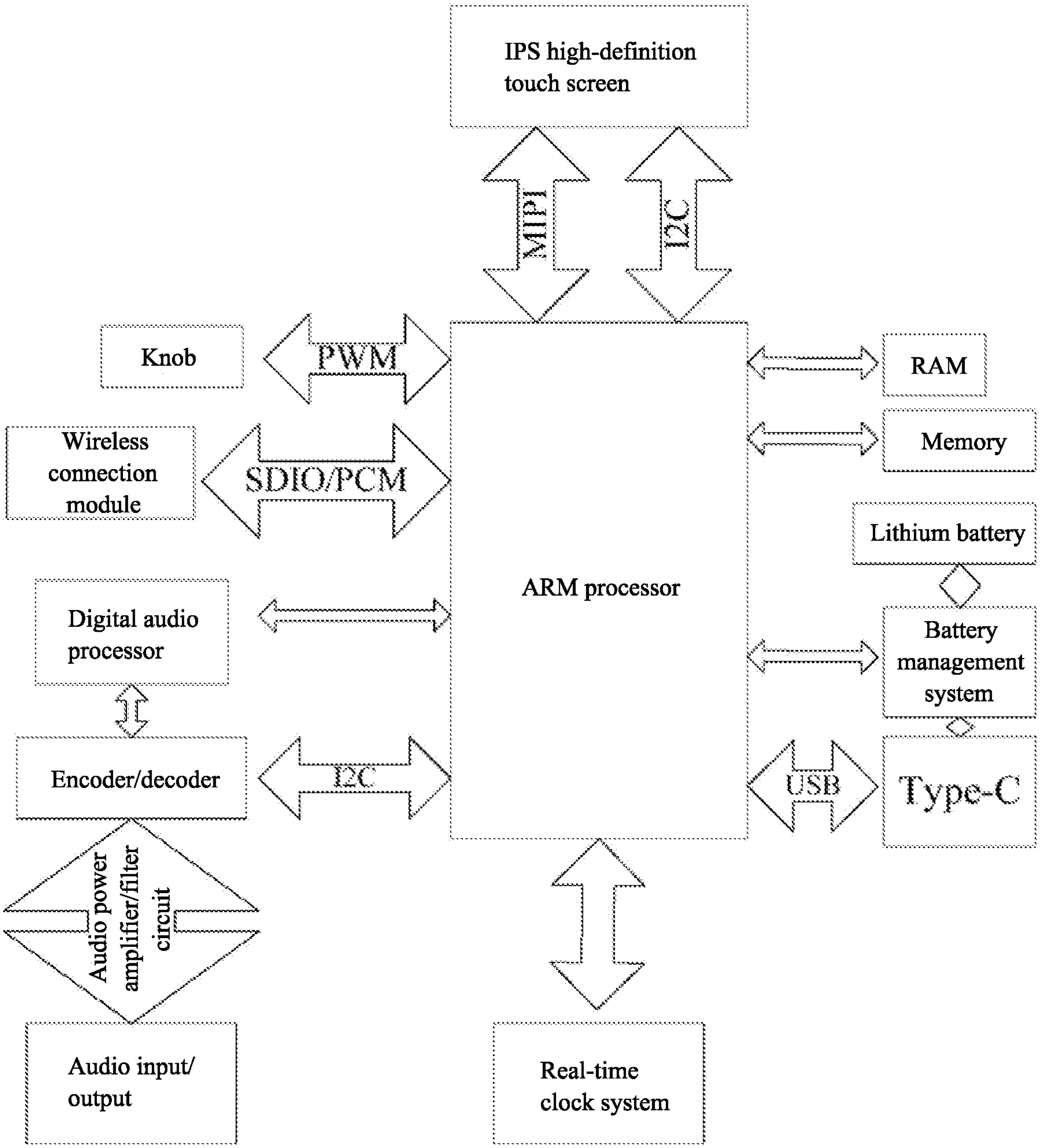
FIG. 4 is a schematic view of a connective structure of components of the pickup.

For the above-mentioned pickup, as shown in FIG. 4, a pickup is shown. The first processor can be connected to the IPS high-definition touch screen through the MIPI interface and the I2C interface. The first processor is connected to the memory and the ARM. The ARM can be the operating memory of the system. The memory can be used for system and data storage, such as audio packages of multiple types of timbres. The first processor is connected to the lithium battery through the battery management system. The USB interface on the first processor can be an interface for charging, for connecting to a computer to transfer data, and for upgrading applications. The first processor is connected to the wireless connection module. The wireless connection module may include a WIFI module, which is used to connect to a network or establish a network hotspot to communicate with other devices. BLUETOOTH module is used to transmit audio information to other Bluetooth devices. For example, devices such as mobile phones, ipad, and computers with Bluetooth capabilities. The wireless connection module can also be a 2G/3G/4G/5G module. The first processor is connected to the digital audio processor. The digital audio processor is the second processor. The second processor can amplify and filter the audio information through the encoder/decoder and the audio power amplifier/filter circuit, and then output it. The first processor is also connected to the real-time clock system. Wherein, the first processor may be an ARM processor.

The present invention provides a stringed instrument, including a stringed instrument body and the pickup according to any one of the above embodiments. The pickup is installed on the stringed instrument body. The stringed instrument can be a guitar or an ukulele. As shown in FIG. 2, the stringed instrument takes the guitar as an example. The multi-touch screen 130 in the pickup is installed on the side panel of the stringed instrument. The circuit board 200 combines the first processor and the second processor near to the multi-touch screen 130. The pickup component 110 is arranged at the strings, and the pickup component 110 and the speaker combination 160 are arranged next to each other.

In addition, other structures and functions of the stringed instrument body according to the embodiment of the present invention are known to those of ordinary skill in the art, and in order to reduce redundancy, no further description is provided.

Figure 5:
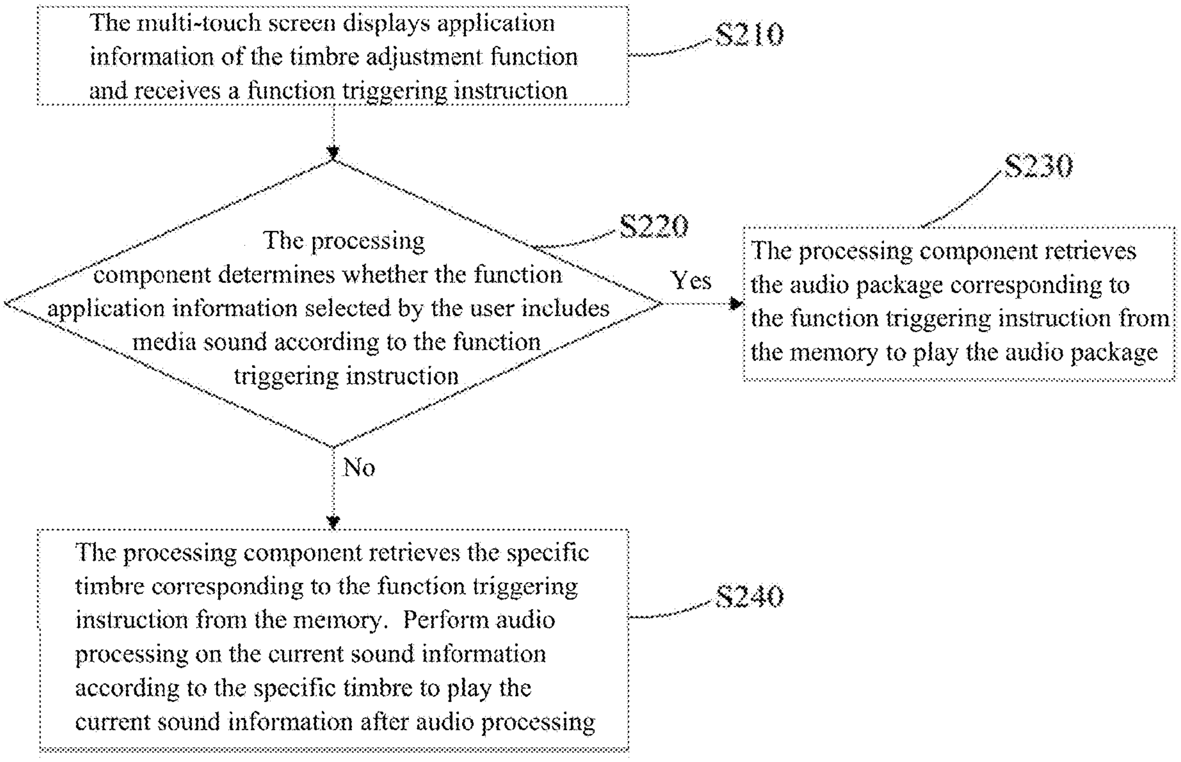
FIG. 5 is a flowchart view of control method for the pickup.

The present invention provides a pickup control method. The pickup provided in this embodiment is the pickup according to the above-mentioned embodiment. The pickup includes a pickup component, a multi-touch screen, and a processing component. As shown in FIG. 5, the Method comprises:

S210: The multi-touch screen 110 displays application information of the timbre adjustment, the tone adjustment and equalizer adjustment, and receives a function triggering instruction. For example, at work, the user can click on the icon for entering the tone selection function to enter the application of the tone adjustment function, and after clicking enter, multiple types of tone information will be displayed. The user selects the specific timbre by clicking on the specific area of the specific timbre.

S220: The processing component determines whether the function application information selected by the user includes media sound according to the function triggering instruction. If it is included, step S230 is executed, and if it is not included, step S240 is executed.

In the processing component, it is judged whether the user selected is a media sound, where the media sound is a sound stored in memory that can be played individually or as an auxiliary sound.

S230: The processing component retrieves the audio package corresponding to the function triggering instruction from the memory to play the audio package; wherein the memory is provided in the pickup, and the memory is connected to the processing component;

The memory can store multiple audio packages of media sounds. When it is the media sound, the processing component can directly retrieve the audio packet corresponding to the function triggering instruction from the memory. The pickup includes a speaker and an interface for connecting a speaker, which can be used to play audio packets. When the audio package is retrieved, the processing component judges whether the interface is in a connected state; that is, whether the interface that is configured to connected to the speaker is connected to the speaker. If the processing component determines that the interface is in a connected state, then the audio packet is sent to the speaker through the interface, and the speaker is used for playback. If the processing component determines that the interface is not in a connected state, it will play the audio packet through the speaker.

S240: The processing component retrieves the specific timbre corresponding to the function triggering instruction from the memory. Perform audio processing on the current sound information according to the specific timbre to play the current sound information after audio processing. The current sound information is the current sound information emitted by the musical instrument collected by the pickup component.

For example, Step S240 can also be: the processing component determine whether to adjust timbre adjustment, tone adjustment or equalizer adjustment, or above all of the three adjustment according to the functions triggering instruction; the processing component determine whether to processing the real-time audio or the non-real-time audio according to the functions triggering instruction. The processing component processes the real-time audio or the non-real-time audio obtained from memory.

Similarly, before playing the current audio information after audio processing, the processing component determines whether the interface is in a connected state. If the processing component determines that the interface is in a connected state, the current sound information after audio processing is sent to the speaker through the interface, and the speaker is used for playback. If the processing component determines that the interface is not in a connected state, the current sound information after audio processing is played through the speaker.

Figure 6:
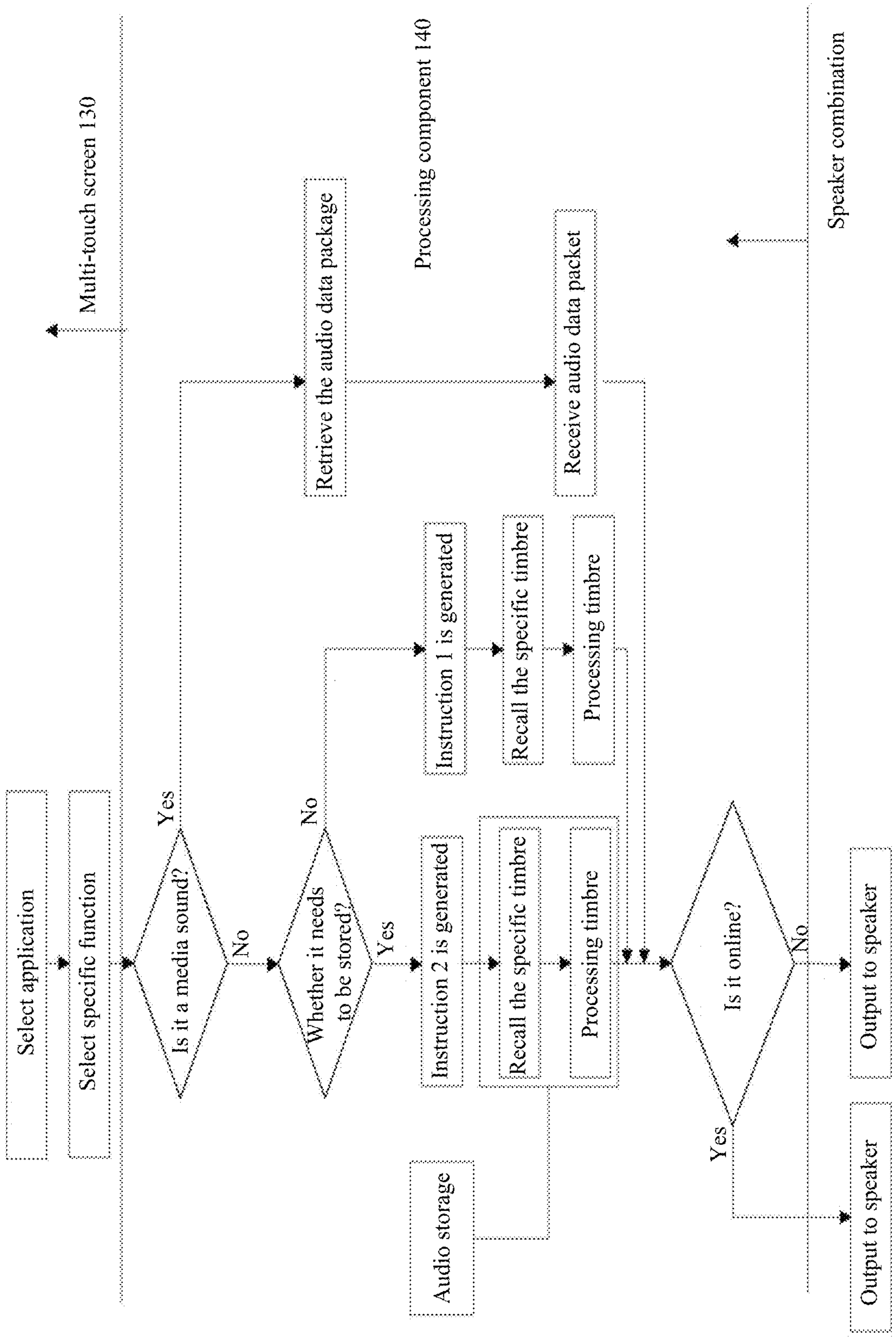
FIG. 6 is a flowchart view of another control method for the pickup.

In another embodiment, as shown in FIG. 6, in this embodiment, in addition to the above process, before the step of the processing component recalling the specific timbre corresponding to the function triggering instruction from the memory, the method further includes:

The processing component judges whether a function triggering instruction regarding storage is received, that is, the processing component judges whether storage is needed. Among them, the basis of the processing component judgment can be that when the user selects storage through the multi-touch screen, the processing component can determine to execute storage when it receives a touch instruction regarding storage.

If the judgment result of the processing component is yes, a second storage instruction, that is, instruction 2 is generated. That is, after performing audio processing on the current sound information according to the specific timbre, according to the second storage instruction, storing the current sound information after audio processing in the memory;

If the judgment result of the processing component is no, then an instruction 1 that does not contain storage is generated. Then, a specific timbre is called, and timbre processing is performed.

The present invention provides a pickup, a stringed instrument, and a pickup control method. Through the multi-touch screen displaying multiple function information of the pickup, the user can view the multiple function application information displayed on the multi-touch screen. According to the application information of multiple functions, the pickup can be controlled through the multi-touch screen. After receiving the user's interaction, the processing component performs sound related processing, so that the user can have more functional choices. It avoids a paucity of functions and enriches the playing experience. The first processor and the second processor work with each other. Using a fast processor to process real-time audio can reduce the delay of real-time audio output. Using a more powerful first processor for non-real-time audio allows for more audio tuning capabilities. Thus, the user experience can be improved and the sound output effect of string instruments can be enriched.

Finally, it should be noted that the above embodiments are only used to illustrate the technical solutions of the present invention, but not to limit them. Although the present invention has been described in detail with reference to the foregoing embodiments, those of ordinary skill in the art should understand that they can still modify the technical solutions described in the foregoing embodiments or make equivalents to some or all of the technical features. replace. However, these modifications or replacements do not cause the essence of the corresponding technical solutions to deviate from the scope of the technical solutions of the embodiments of the present invention.

The following points need to be noted:

(1) The attached drawings of the embodiments of this patent application only relate to the structures involved in the embodiments of this patent application, and other structures can be referred to the general design.

(2) For clarity, the thickness of layers or regions is enlarged or reduced in the drawings used to describe embodiments of this patent application, i.e. these drawings are not drawn to the actual scale. It is understood that when a component such as a layer, film, region, or substrate is said to be "on" or "under" another component, that component may be "directly" on or under another component or there may be an intermediate component.

(3) In the case of no conflict, embodiments of this patent application and features in embodiments can be combined to obtain new embodiments.

This patent application claims the priority of The Chinese patent application No. 201910494960.0 and No. 201920859306.0, which were filed on Jun. 6, 2019. The above disclosed contents of the Chinese patent application are quoted herein as part of this application.

What is claimed is:

1. A pickup comprising:

a pickup component, a multi-touch screen, and a processing component; wherein the multi-touch screen is connected to the processing component, the pickup component is connected to the processing component;

the pickup component is configured to pick up sound information emitted by a musical instrument;

the multi-touch screen is configured to display function application information that is selected from a group consisting of timbre adjustment function application information, tone adjustment function application information, and equalizer adjustment function application information; the multi-touch screen is configured to receive a function triggering instruction; the function triggering instruction is generated by a user touching the multi-touch screen to realize a function control of the pickup;

the processing component is configured to generate function control information triggered by the function triggering instruction, and adjust the sound information;

wherein the processing component comprises a first processor and a second processor;

the first processor is constructed to determine whether a real-time audio or a non-real-time audio is to be processed based on the function triggering instruction; if the non-real-time audio is to be processed, it is necessary to determine that the function triggering instruction is timbre adjustment function application information, or tone adjustment function application information, or equalizer adjustment function application information, or all the above, the audio is processed accordingly; if the real-time audio is to be processed, there is no action need to be performed;

the second processor is constructed to determine whether the real-time audio or the non-real-time audio is to be processed based on the function triggering instruction; if the real-time audio is to be processed, it is necessary to determine that the function triggering instruction is timbre adjustment function application information, or tone adjustment function application information, or equalizer adjustment function application information, or all the above, the audio is processed accordingly; if the non-real-time audio is to be processed, there is no action need to be performed.

2. The pickup of claim 1, wherein the processing component comprises a CPLD processor or an FPGA processor.

3. The pickup of claim 1, wherein the processing component comprises:

a first processor and a second processor, wherein the first processor is configured to determine, according to the function triggering instruction, that the function triggering instruction is an instruction to trigger the tone adjustment function application information or the equalizer adjustment function application information, generate first function control information to perform tone or equalizer adjustment on the sound information;

the second processor is configured to determine, according to the function triggering instruction, that the function triggering instruction is an instruction to trigger the timbre adjustment function application information or the equalizer adjustment function application information, and generate second function control information to perform timbre adjustment or equalizer adjustment on the sound information.

4. The pickup of claim 3, wherein the first processor is an ARM processor, the second processor is a DSP processor.

5. The pickup of claim 3, further comprising:

a memory, the memory connected to the first processor, the first processor is configured to generate a first storage instruction related to the sound information, and transmit the first storage instruction to the second processor;

the second processor is configured to send the sound information to the first processor according to the first storage instruction;

the first processor is configured to store the sound information in the memory.

6. The pickup of claim 3, further comprising:

a loudspeaker combination, the loudspeaker combination is connected to the second processor and/or the first processor, the loudspeaker combination is configured to play adjusted sound information.

7. The pickup of claim 3, wherein the first processor and the second processor are concentrated on a circuit board, and the multi-touch screen is connected to the circuit board.

8. A stringed instrument comprising: a stringed instrument body; and the pickup according to claim 1, wherein the pickup is installed on the stringed instrument body, wherein the multi-touch screen in the pickup is installed on a side panel of the stringed instrument.

9. The stringed instrument of claim 8, wherein the processing component comprises a CPLD processor or an FPGA processor.

10. The stringed instrument of claim 8, wherein the processing component comprises:

a first processor and a second processor, wherein the first processor is configured to determine, according to the function triggering instruction, that the function triggering instruction is an instruction to trigger the tone adjustment function application information or the equalizer adjustment function application information, generate first function control information to perform tone or equalizer adjustment on the sound information;

the second processor is configured to determine, according to the function triggering instruction, that the function triggering instruction is an instruction to trigger the timbre adjustment function application information or the equalizer adjustment function application information, and generate second function control information to perform timbre adjustment or equalizer adjustment on the sound information.

11. The stringed instrument of claim 10, wherein the first processor is an ARM processor, the second processor is a DSP processor.

12. The stringed instrument of claim 11, further comprising:

a memory, the memory connected to the first processor, the first processor is configured to generate a first storage instruction related to the sound information, and transmit the first storage instruction to the second processor;

the second processor is configured to send the sound information to the first processor according to the first storage instruction;

the first processor is configured to store the sound information in the memory.

13. The stringed instrument of claim 10, further comprising:

a memory, the memory connected to the first processor, the first processor is configured to generate a first storage instruction related to the sound information, and transmit the first storage instruction to the second processor;

the second processor is configured to send the sound information to the first processor according to the first storage instruction;

the first processor is configured to store the sound information in the memory.

14. The stringed instrument of claim 10, further comprising:

a loudspeaker combination, the loudspeaker combination is connected to the second processor and/or the first processor, the loudspeaker combination is configured to play adjusted sound information.

15. The stringed instrument of claim 10, wherein the first processor and the second processor are concentrated on a circuit board, and the multi-touch screen is connected to the circuit board.

* * * * *